US012702973B2

(12) United States Patent
Tai et al.

(10) Patent No.: US 12,702,973 B2
(45) Date of Patent: Aug. 11, 2026

(54) NUCLEIC ACID EXTRACTION CARTRIDGE AND OPERATING METHOD THEREOF

(71) Applicant: LABTURBO BIOTECH CORPORATION, Taipei City (TW)

(72) Inventors: Chi-Sheng Tai, Taipei City (TW); Shih-Jeng Dai, Taipei City (TW)

(73) Assignee: LABTURBO BIOTECH CORPORATION, Taipei City (TW)

( * ) Notice: Subject to any disclaimer, the term of this patent is extended or adjusted under 35 U.S.C. 154(b) by 476 days.

(21) Appl. No.: 18/501,007

(22) Filed: Nov. 2, 2023

(65) Prior Publication Data

US 2024/0261778 A1 Aug. 8, 2024

(30) Foreign Application Priority Data

Feb. 7, 2023 (TW) ................................ 112104302

(51) Int. Cl.

| | |
|---|---|
| ***B01L 3/00*** | (2006.01) |
| ***B01D 15/08*** | (2006.01) |
| ***B01F 33/302*** | (2022.01) |
| ***B01F 33/3033*** | (2022.01) |
| ***B01J 8/00*** | (2006.01) |
| ***B01J 8/02*** | (2006.01) |
| ***B01J 20/285*** | (2006.01) |
| ***B01J 20/287*** | (2006.01) |
| ***B01J 20/32*** | (2006.01) |
| ***B01L 7/00*** | (2006.01) |
| ***B01L 9/00*** | (2006.01) |
| ***B65G 47/80*** | (2006.01) |
| ***B82Y 20/00*** | (2011.01) |
| ***B82Y 30/00*** | (2011.01) |
| ***B82Y 40/00*** | (2011.01) |

(Continued)

(52) U.S. Cl.
CPC ....... *B01L 3/502* (2013.01); *B01L 2200/0684* (2013.01); *B01L 2300/044* (2013.01)

(58) Field of Classification Search
CPC ............. B01L 3/502; B01L 2200/0684; B01L 2300/044; B01L 3/5082; B01L 2200/04; C12N 15/1003; C12N 15/1017; G01N 2035/0436; G01N 35/04; G01N 35/0099; G01N 35/1009; G01N 2035/1039; C12Q 1/6806
See application file for complete search history.

(56) References Cited

U.S. PATENT DOCUMENTS

2017/0152510 A1* 6/2017 Lorenz .............. C12N 15/1017

FOREIGN PATENT DOCUMENTS

CN 101389757 A * 3/2009
EP 2942394 A1 11/2015

(Continued)

*Primary Examiner* — Oyeleye Alexander Alabi
(74) *Attorney, Agent, or Firm* — Cheng-Ju Chiang

(57) ABSTRACT

The present invention discloses a nucleic acid extraction cartridge. The cartridge comprises a plurality of tubes for pre-disposing reagents and consumables and a waste tank for storing waste liquid generated during the extraction process. During the extraction process, it is possible to cooperate with a positive pressure pump or a negative pressure pump, for pushing or drawing the liquid inside the membrane tube passing through a semi-permeable membrane. With an automatic platform having a programmable working arm, an automatic process can be achieved.

7 Claims, 7 Drawing Sheets

(51) Int. Cl.

| | |
|---|---|
| ***C02F 1/469*** | (2023.01) |
| ***C08L 5/08*** | (2006.01) |
| ***C12M 1/34*** | (2006.01) |
| ***C12M 3/06*** | (2006.01) |
| ***C12N 1/14*** | (2026.01) |
| ***C12N 1/20*** | (2026.01) |
| ***C12Q 1/02*** | (2006.01) |
| ***C12Q 1/6806*** | (2018.01) |
| ***C12Q 1/6844*** | (2018.01) |
| ***C12Q 1/6848*** | (2018.01) |
| ***C12Q 1/6851*** | (2018.01) |
| ***C12Q 1/686*** | (2018.01) |
| ***G01K 1/14*** | (2021.01) |
| ***G01N 1/44*** | (2006.01) |
| ***G01N 15/10*** | (2024.01) |
| ***G01N 15/14*** | (2024.01) |
| ***G01N 15/1433*** | (2024.01) |
| ***G01N 21/01*** | (2006.01) |
| ***G01N 21/03*** | (2006.01) |
| ***G01N 21/05*** | (2006.01) |
| ***G01N 21/29*** | (2006.01) |
| ***G01N 21/33*** | (2006.01) |
| ***G01N 21/35*** | (2014.01) |
| ***G01N 21/65*** | (2006.01) |
| ***G01N 21/75*** | (2006.01) |
| ***G01N 21/77*** | (2006.01) |
| ***G01N 27/07*** | (2006.01) |
| ***G01N 27/28*** | (2006.01) |
| ***G01N 27/416*** | (2006.01) |
| ***G01N 30/02*** | (2006.01) |
| ***G01N 30/60*** | (2006.01) |
| ***G01N 30/72*** | (2006.01) |
| ***G01N 31/10*** | (2006.01) |
| ***G01N 31/12*** | (2006.01) |
| ***G01N 33/543*** | (2006.01) |
| ***G01N 33/557*** | (2006.01) |
| ***G01N 33/564*** | (2006.01) |
| ***G01N 33/574*** | (2006.01) |
| ***G01N 33/575*** | (2026.01) |
| ***G01N 33/57515*** | (2026.01) |
| ***G01N 33/58*** | (2006.01) |
| ***G01N 33/68*** | (2006.01) |
| ***G01N 33/72*** | (2006.01) |
| ***G01N 35/00*** | (2006.01) |
| ***H05B 45/10*** | (2020.01) |

(56) References Cited

FOREIGN PATENT DOCUMENTS

| | | | | |
|---|---|---|---|---|
| JP | 2017018053 | A | * | 1/2017 |
| TW | 1406712 | B1 | | 9/2013 |
| TW | 201412981 | A | | 4/2014 |

* cited by examiner

NUCLEIC ACID EXTRACTION CARTRIDGE AND OPERATING METHOD THEREOF

FIELD OF THE INVENTION

The present invention relates to a nucleic acid extraction cartridge and an operating method thereof, and more particularly relates to an automation platform in the biotechnology industry.

BACKGROUND OF THE INVENTION

In the field of biotechnology, for most applications such as PCR reactions, the samples need a nucleic acid extraction, first. The nucleic acid extraction is a reaction process involving multiple reagents, multiple consumables and multiple steps. Traditionally, the reagents and the consumables must be prepared before each nucleic acid extraction to ensure the smoothness and quality of the reaction process possessing the multiple steps. This method is relatively error-prone, so the nucleic acid extraction cartridge predisposed with the multiple reagents and the multiple consumables is provided, accordingly.

The steps of the nucleic acid extraction include sample dissolution (lysis), nucleic acid adsorption on the semi-permeable membrane (bind), cleaning of impurities on the semi-permeable membrane (wash) and nucleic acid recovery from the semi-permeable membrane (elution), etc. Each step possesses its corresponding reagents, consumables (plastic tubes, pipettes, etc.), and tools and equipment (such as centrifuges, vacuum pumps or automated working arms, etc.). In these steps of the extraction, cross-contamination among samples should also be avoided, and nucleic acid with good quality can be obtained to facilitate back-end nucleic acid applications (such as PCR).

Most of the traditional nucleic acid extraction cartridges utilize the automatic extraction method of magnetic beads, but some samples are not suitable for the magnetic bead method. A few utilizes the membrane tube extraction method but there are limitations, especially the volume of the sample is limited below 0.5 ml due to the complexity of the design.

Therefore, there is a need to provide a nucleic acid extraction cartridge and an operating method thereof to solve the aforesaid technical problems.

SUMMARY OF INVENTION

For solving the aforesaid technical problems, the present invention provides a nucleic acid extraction cartridge and an operating method thereof, and the membrane tube is adopted, and the sample volume can reach more than 1 ml. The nucleic acid extraction cartridge of the present invention comprises a plurality of tubes for pre-disposing reagents and consumables and a waste tank for storing waste liquid generated during the extraction process. During the extraction process, it is possible to cooperate with a positive pressure pump or a negative pressure pump, for pushing or drawing the liquid inside the membrane tube to pass through a semi-permeable membrane. With an automatic platform having a programmable working arm, an automatic process can be achieved.

To realize the aforesaid objective, the present invention provides a nucleic acid extraction cartridge, comprising a nucleic acid extraction cartridge main body and a waste liquid tank. The waste liquid tank is formed on the nucleic acid extraction cartridge main body. The waste liquid tank comprises a membrane tube compartment, a first connecting port and a ventilation port. The membrane tube compartment is employed to place a membrane tube for extraction. The first connecting port connects the waste liquid tank and the membrane tube compartment.

In a preferred embodiment, the membrane tube for extraction further comprises an open end, a waste liquid drain and a semi-permeable membrane. The open end is arranged on top of the membrane tube for extraction. The waste liquid drain is arranged under the membrane tube for extraction to connect to the first connecting port. The semi-permeable membrane is arranged above the waste liquid drain.

In a preferred embodiment, a ventilation port is connected with a suction device.

In a preferred embodiment, an insufflation device is connected to the open end.

In a preferred embodiment, the nucleic acid extraction cartridge further comprises a liquid storage area formed on the nucleic acid extraction cartridge main body, and the liquid storage area is employed to store at least one liquid.

In a preferred embodiment, the nucleic acid extraction cartridge further comprises a pipette area formed on the nucleic acid extraction cartridge main body, and the pipette area is employed to accommodate at least one pipette.

To realize the aforesaid objective, the present invention further provides an operating method of a nucleic acid extraction cartridge, comprising: first, performing Step A, putting a sample into a sample tube of the nucleic acid extraction cartridge; then, performing Step B, placing the nucleic acid extraction cartridge on an automation platform with a working arm, which is programmable; then, performing Step C, starting the automation platform to perform a nucleic acid extraction process, the nucleic acid extraction process comprising: first, performing Step C1, taking a first pipette to draw a reaction liquid from a liquid storage area to the sample tube to form a first mixing liquid by the working arm; then, performing Step C2, moving the first mixing liquid into a membrane tube for extraction placed in a waste liquid tank of the nucleic acid extraction cartridge; then, performing Step C3, starting an insufflation device or a suction device to push or draw the first mixing liquid in the membrane tube for extraction to enter the waste liquid tank through a semi-permeable membrane of the membrane tube for extraction; then, performing Step C4, taking a second pipette to draw a cleaning liquid from the liquid storage area to be added in the membrane tube for extraction by the working arm; then, performing Step C5, starting the insufflation device or the suction device to push or draw the cleaning liquid in the membrane tube for extraction to pass through the semi-permeable membrane; then, performing Step C6, repeating Steps C4 and C5 for 1-4 times; and then, performing Step C7, moving the membrane tube for extraction to a recovery tube hole in the liquid storage area, and pressing the membrane tube for extraction into the recovery tube hole so that an eluting liquid contained in the recovery tube hole is pressed through the semi-permeable membrane to enter the membrane tube for extraction by the working arm; at last, performing Step D, accomplishing the nucleic acid extraction process.

Compared with prior arts, the nucleic acid extraction cartridge of the present invention comprises the plurality of tubes for pre-disposing the reagents and the consumables and the waste tank for storing waste liquid generated during the extraction process. During the extraction process, it is possible to cooperate with the positive pressure pump or the negative pressure pump, for pushing or drawing the liquid inside the membrane tube to pass through the semi-permeable membrane. With the automatic platform having the programmable working arm, an automatic process can be achieved.

BRIEF DESCRIPTION OF THE ACCOMPANYING DRAWINGS

DETAILED DESCRIPTION OF PREFERRED EMBODIMENTS

The following descriptions of the embodiments refer to the appended figures to illustrate specific embodiments in which the present application may be implemented. The directional terms of up, down, front, rear, left, right, interior, exterior, side, etcetera mentioned in the present application are merely directions of referring to appended figures. Therefore, the aforesaid directional terms are employed for explaining and understanding the present application, but the present application is not limited thereto.

Figure 1:
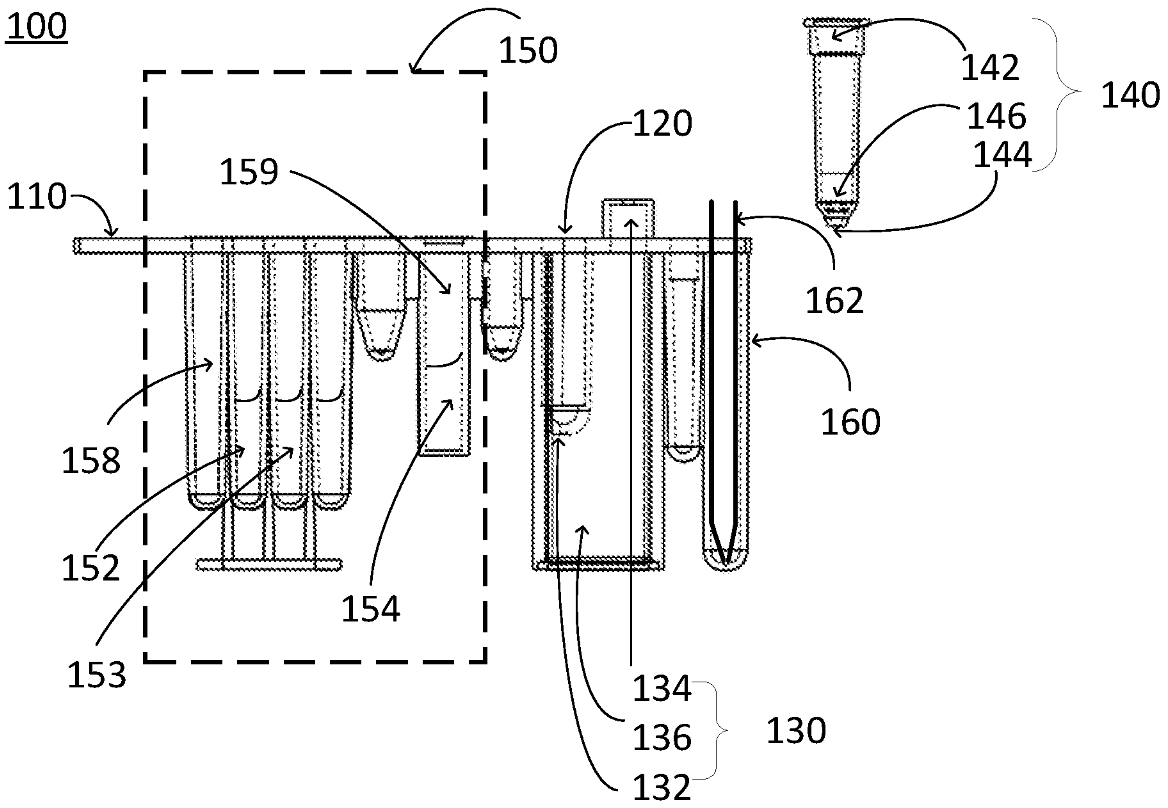
FIG. 1 shows a schematic diagram of a nucleic acid extraction cartridge according to the present invention.
Figure 2:
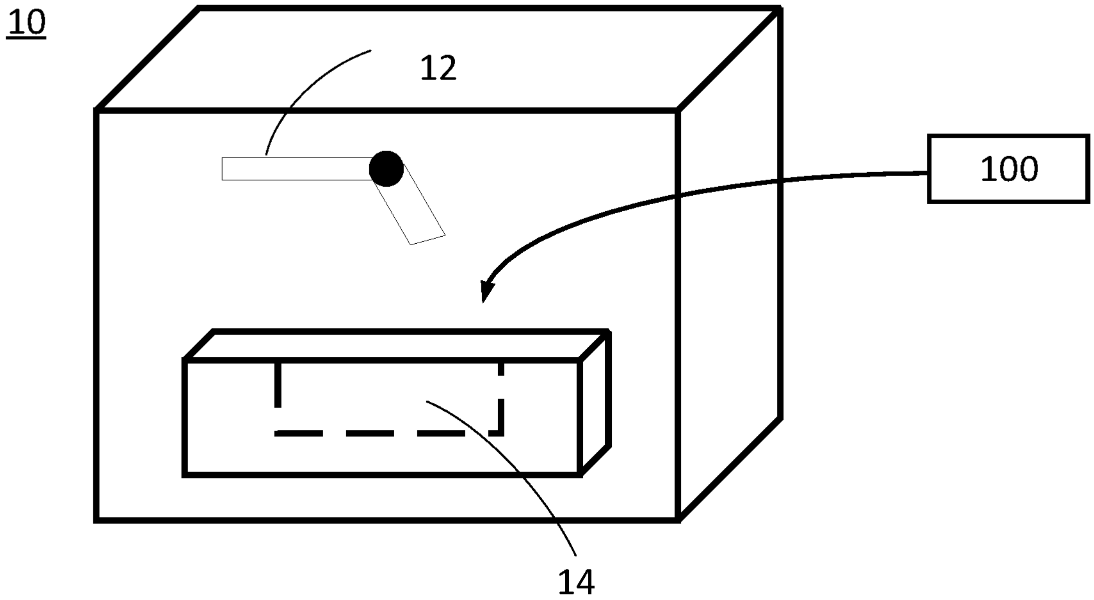
FIG. 2 shows a schematic diagram of an automatic platform according to the present invention.
Figure 3:
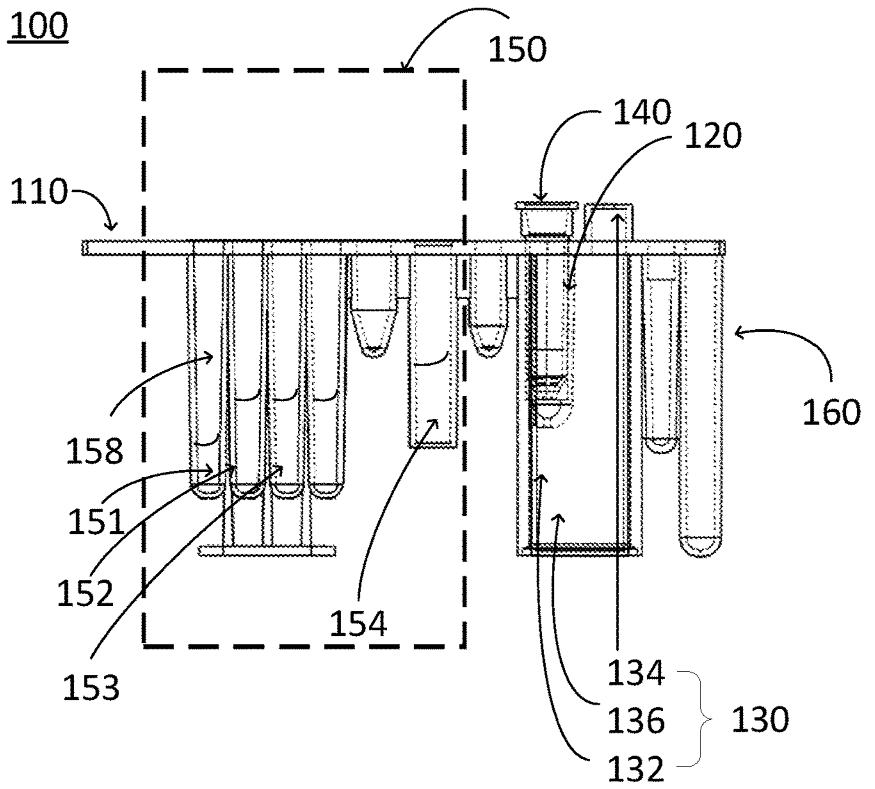
FIGS. 3-10 depict operation diagrams of the nucleic acid extraction cartridge according to the present invention.

Please refer to FIG. 1 to FIG. 2. FIG. 1 shows a schematic diagram of a nucleic acid extraction cartridge 100 according to the present invention; FIG. 2 shows a schematic diagram of an automatic platform 10 according to the present invention. The nucleic acid extraction cartridge 100 comprises a nucleic acid extraction cartridge main body 110, a liquid storage area 150, a pipette area 160 and a waste liquid tank 130. The waste liquid tank 130 is formed on the nucleic acid extraction cartridge main body 110. The waste liquid tank 130 comprises a membrane tube compartment 120, a first connecting port 132 and a ventilation port 134. The waste liquid tank 130 further comprises a container 136. The container 136 is disposed between the first connecting port 132 and the ventilation port 134 for containing the waste liquid, and the membrane tube compartment 120 is employed to place a membrane tube for extraction 140. The first connecting port 132 connects the waste liquid tank 130 and the membrane tube compartment 120. The liquid storage area 150 is formed on the nucleic acid extraction cartridge main body 110, and comprises a sample tube 158 for accommodating a sample 151 and a plurality of tubes for accommodating a reaction liquid 152, a cleaning liquid 153 and an eluting liquid 154, respectively. The pipette area 160 is formed on the nucleic acid extraction cartridge main body 110, and the pipette area 160 is employed to accommodate at least one pipette 162. As shown in this figure, only one pipette 162 is shown, in fact, the pipe holes can be added for placing more pipettes 162 as required.

Moreover, the membrane tube for extraction 140 further comprises an open end 142, a waste liquid drain 144 and a semi-permeable membrane 146. The open end 142 is arranged on top of the membrane tube for extraction 140. The waste liquid drain 144 is arranged under the membrane tube for extraction 140 to connect to the first connecting port 132. The semi-permeable membrane 146 is arranged above the waste liquid drain 144. The semi-permeable membrane 146 possesses the property of selectively allowing liquid to pass through but nucleic acid cannot pass through.

For ease of description, the nucleic acid extraction cartridge of the present invention is divided into three areas: 1. core operation area; 2. pipette area; 3. reagent area (liquid storage area 130).

1. core operation area. This area comprises the waste liquid tank 130 with the membrane tube compartment 120 where the membrane tube for extraction 140 can be placed, and a connection with a positive pressure device or a negative pressure device (pump or other device) is reserved. The negative pressure device (such as a vacuum pump) connects the ventilation port 134 to draw the liquid in the membrane tube for extraction 140 passes through the semi-permeable membrane 146 to the container 136 therebelow. The size of the container 136 can be designed according to the volume of the sample and the work flow, and generally the capacity of the container 136 is 3-6 times the volume of the sample 151; steps such as nucleic acid adsorption on the semi-permeable membrane 146 (bind), and cleaning of impurities on the semi-permeable membrane (wash) can be performed here.
2. pipette area. The pipette area 160 comprises at least one tube hole, which can be pre-disposed with pipettes to provide suction pipettes for automatic working arm pipetting.
3. reagent area. The reagent area comprises multiple tubes, which can pre-dispose the reagents required for each step and place the sample, and perform steps such as sample dissolution (lysis), nucleic acid recovery from the semi-permeable membrane (elution), and nucleic acid placement; as performing nucleic acid extraction, the cartridge is first put into the automation platform, and the program is started so that all steps can be fully automated.

As shown in FIG. 2, the automation platform 10 comprises a working arm 12 and a cartridge placement area 14. In general, after the sample 151 is added in the sample tube 158, the nucleic acid extraction cartridge 100 can be put into the cartridge placement area 14. Then, the nucleic acid extraction process is performed by the automation platform 10 (including necessary components, such as computer and memory), and the working arm 12 is employed to move the pipette 162 (liquid) and the membrane tube for extraction 140. Specifically, the working arm 12 can clamp the pipette 162 and the membrane tube for extraction 140 for moving. Alternatively, it also can clamp a pipette, utilizing this pipette to take a pipette 162 (disposable) to move the liquid (such as drawing the reaction liquid 152 or cleaning liquid 153 from the pipette area 160 and then moving to the membrane tube for extraction 140 to add the liquid into the membrane tube for extraction 140).

In detail, the working arm 12 is programmed to work with the computer to perform the work of grasping and moving objects.

In detail, the method for allowing the waste liquid to enter the container 136 comprises: 1. ventilation port 134 is connected to a suction device (a negative pressure unit, such as a vacuum pump) to draw the liquid to pass through the semi-permeable membrane 146; 2. after the liquid has been in the membrane tube for extraction 140, the open end 142 is connected with an insufflation device 143 (a positive pressure unit, such as a compressor) to push the liquid to pass through the semi-permeable membrane 146.

Figure 9:
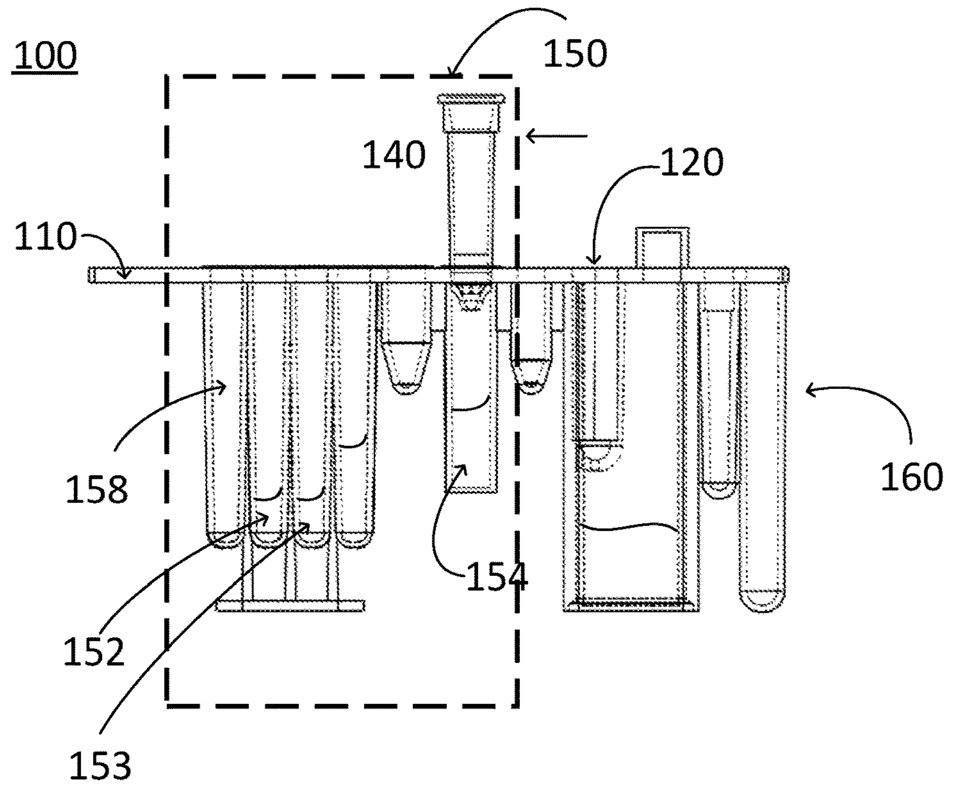
Figure 10:
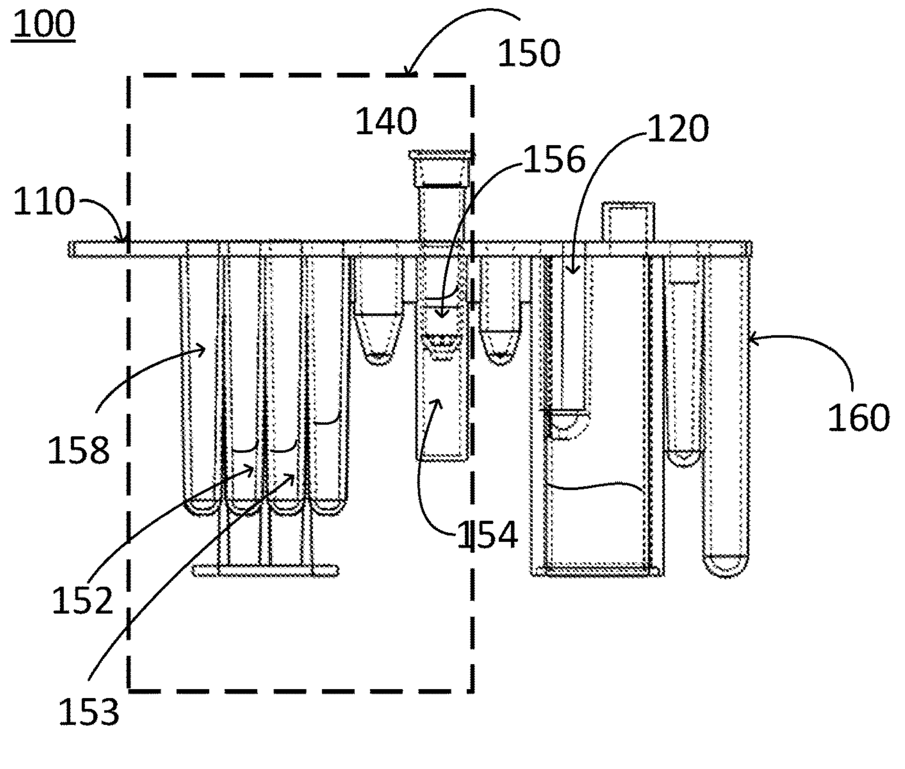
Figure 11:
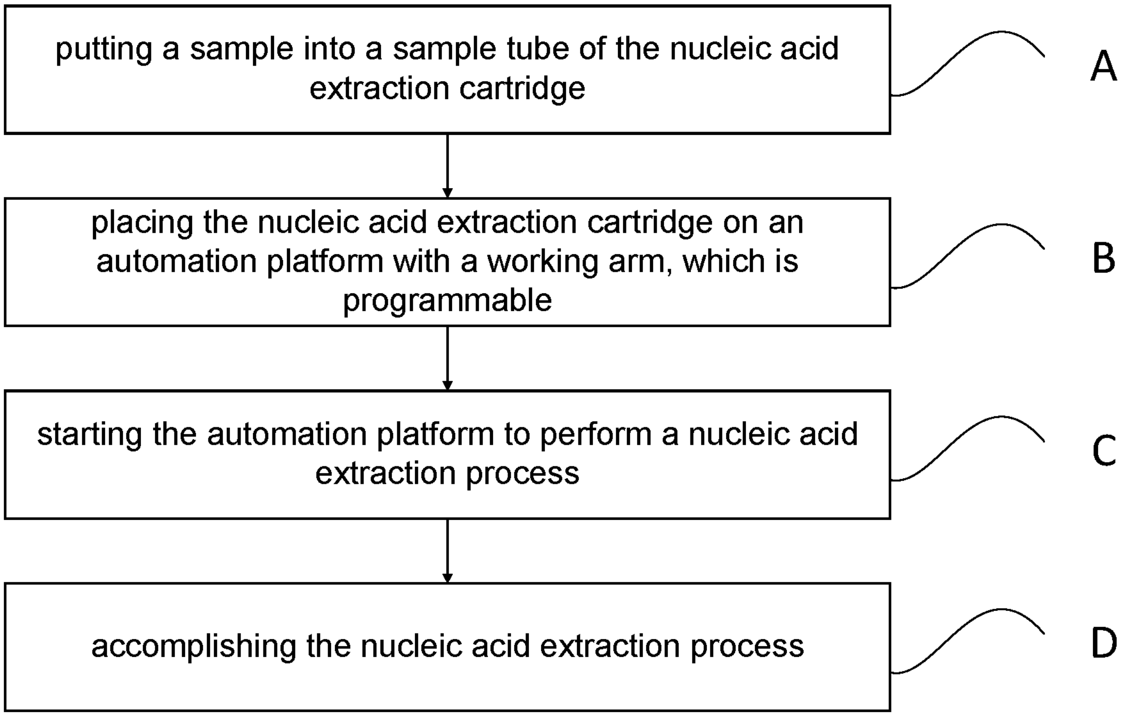
FIGS. 11-12 depict flow charts of an operating method using the nucleic acid extraction cartridge according to the present invention.
Figure 12:
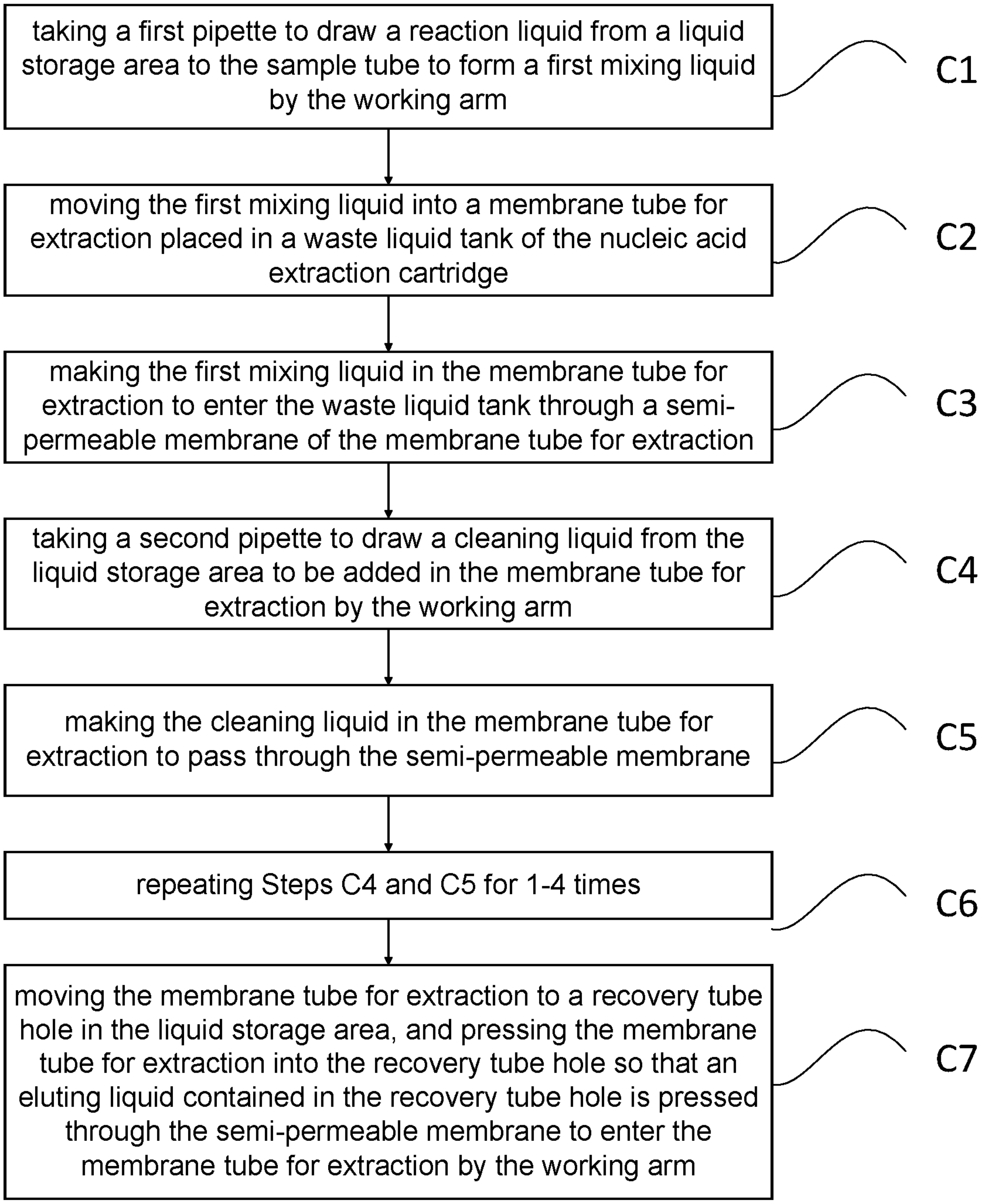

Please refer to FIGS. 3-12. FIGS. 3-10 depict operation diagrams of the nucleic acid extraction cartridge 100 according to the present invention; FIGS. 11-12 depict flow charts of an operating method using the nucleic acid extraction cartridge 100 according to the present invention. Please refer to FIGS. 1-2 for component symbols, which will not be repeated here. Next, the operating method of the nucleic acid extraction cartridge 100 of the present invention will be described step by step with diagrams. First, referring to FIG. 3, Step A is performed, and a sample 151 is put into a sample tube 158 of the nucleic acid extraction cartridge 100. Generally, Step A can be processed manually or automatically according to different situations.

Referring to FIG. 2, then Step B is performed, and the nucleic acid extraction cartridge 100 is placed on an automation platform 10 with a working arm 12, which is programmable. Then, Step C is performed, and the automation platform is started to perform a nucleic acid extraction process. At last, Step D is performed, and the nucleic acid extraction process is accomplished.

Step C, that is, the nucleic acid extraction process is the most important part of the present invention, which comprises following steps.

Figure 4:
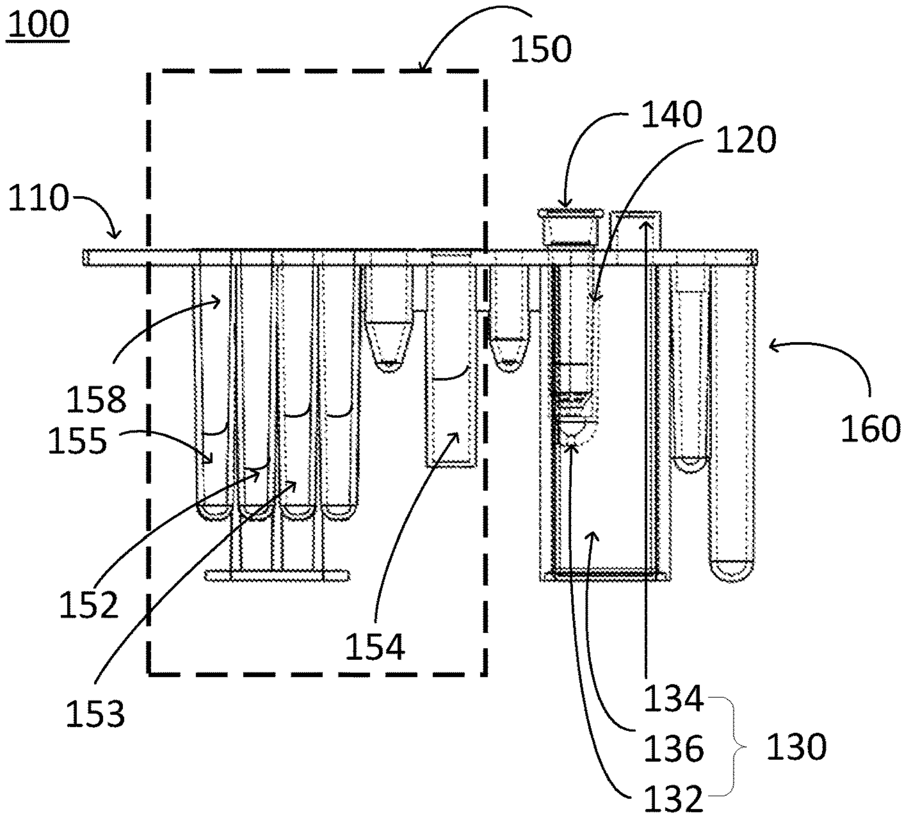

First, referring to FIG. 4, Step C1 is performed, and a first pipette 162 is taken to draw a reaction liquid 152 from a liquid storage area 150 to the sample tube 158 to form a first mixing liquid 155 by the working arm 12. In detail, the reaction liquid 152 can dissolve (Lysis) the nucleic acid in the sample 151, and generally, the reaction liquid 152 will contain alcohol.

Figure 5:
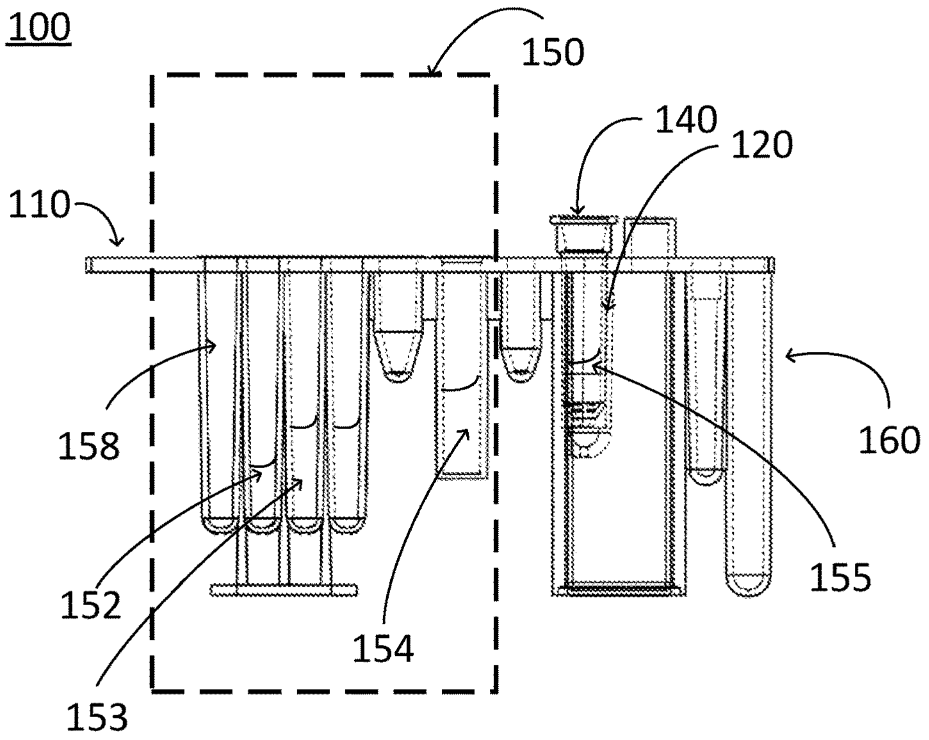

Then, referring to FIG. 5, Step C2 is performed, and the first mixing liquid 155 is moved into a membrane tube for extraction 140 placed in a waste liquid tank 120 of the nucleic acid extraction cartridge 100.

Figure 6:
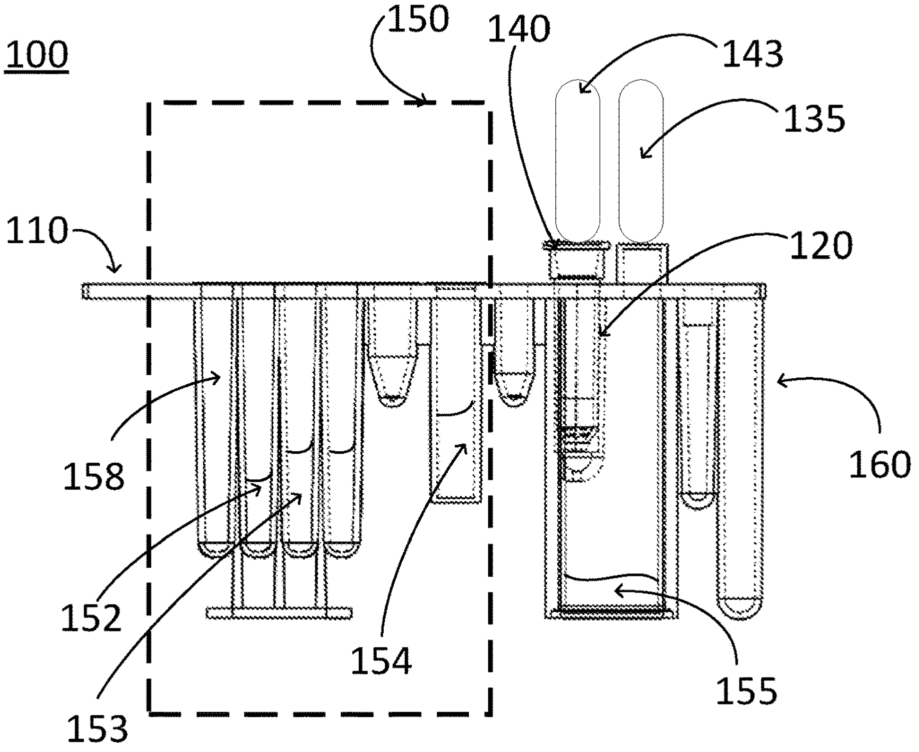

Then, referring to FIG. 6, Step C3 is performed, and the first mixing liquid 155 in the membrane tube for extraction 140 enters the waste liquid tank 130 through a semi-permeable membrane 146 of the membrane tube for extraction 140. Here, a positive pressure unit or a negative pressure unit is employed as an insufflation device 143 or a suction device 135 to push or draw the first mixing liquid 155 to enter the waste liquid tank 130 through the semi-permeable membrane 146. The detailed method is as mentioned above, and will not be repeated here.

Figure 7:
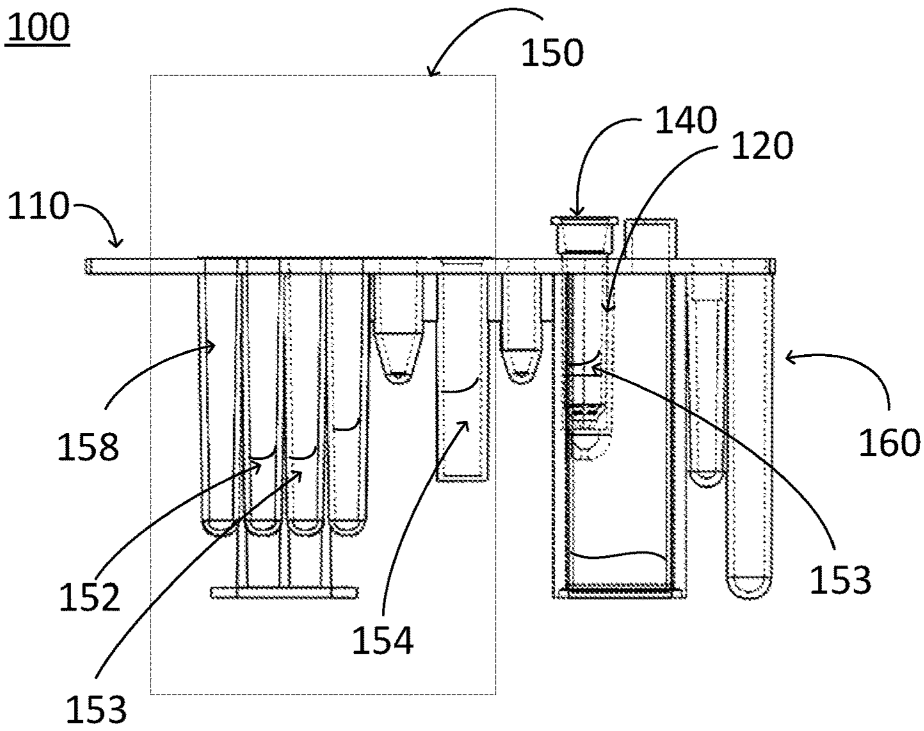

Then, referring to FIG. 7, Step C4 is performed, and a second pipette 162 is taken to draw a cleaning liquid 153 from the liquid storage area 150 to be added in the membrane tube for extraction 140 by the working arm 12. Specifically, the first pipette 162 and the second pipette 162 are different pipettes 162 to avoid cross-contamination of liquids. Generally, the pipettes 162 are disposable.

Figure 8:
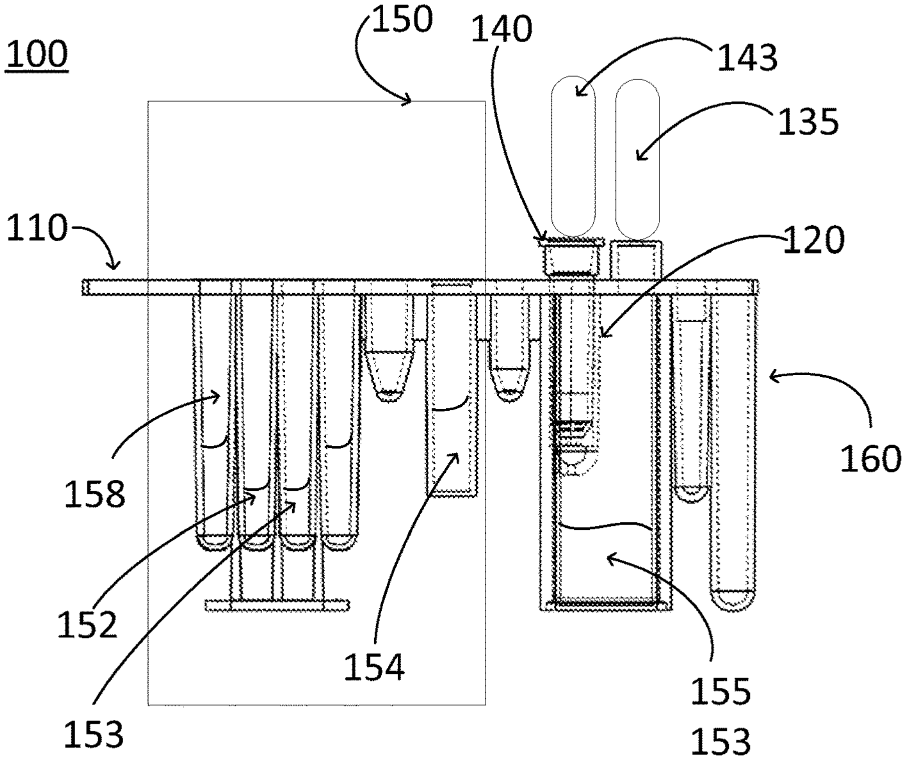

Then, referring to FIG. 8, Step C5 is performed, and the cleaning liquid 153 in the membrane tube for extraction 140 passes through the semi-permeable membrane 146. Here, a positive pressure unit or a negative pressure unit is employed as an insufflation device 143 or a suction device 135 to push or draw the cleaning liquid 153 to enter the waste liquid tank 130 through the semi-permeable membrane 146. The detailed method is as mentioned above, and will not be repeated here. Then, Step C6 is performed, and Steps C4 and C5 are repeated for 1-4 times. Here, the number of cleanings can be adjusted according to requirements (sample or environment, etc.).

Finally, referring to FIGS. 9-10, Step C7 is performed, and the membrane tube for extraction 140 is moved to a recovery tube hole 159 in the liquid storage area 150, and the membrane tube for extraction 140 is pressed into the recovery tube hole 159 so that an eluting liquid 154 contained in the recovery tube hole 159 is pressed through the semi-permeable membrane 146 to enter the membrane tube for extraction 140 by the working arm 12.

In detail, the movement of the liquid in the present invention is accomplished by utilizing the working arm 12 to clamp the pipette and then take a pipette 162. Alternatively, the pipette can be arranged on the working arm 12 and move it together. The pipette 162 can be used only when it is needed, and the clamp on the working arm 12 is used to clamp and move the membrane tube for extraction 140 when the pipette is not needed.

Compared with prior arts, the present invention employs the nucleic acid extraction cartridge comprising the plurality of tubes for pre-disposing the reagents and the consumables and the waste tank for storing waste liquid generated during the extraction process. During the extraction process, it is possible to cooperate with the positive pressure pump or the negative pressure pump, for pushing or drawing the liquid inside the membrane tube to pass through the semi-permeable membrane. With the automatic platform having the programmable working arm, an automatic process can be achieved.

Above are only preferred embodiments of the present invention, and it should be noted that to any persons who are skilled in the art, improvement and modification which is easily derived should be covered by the protected scope of the application. Thus, the protected scope of the application should go by the subject claims, including the improvement and the modification.

What is claimed is:

1. An operating method of a nucleic acid extraction cartridge, comprising steps of:

A) putting a sample into a sample tube of the nucleic acid extraction cartridge;

B) placing the nucleic acid extraction cartridge on an automation platform with a working arm, which is programmable;

C) starting the automation platform to perform a nucleic acid extraction process:

C1) taking a first pipette to draw a reaction liquid from a liquid storage area to the sample tube to form a first mixing liquid by the working arm;

C2) moving the first mixing liquid into a membrane tube for extraction placed in a waste liquid tank of the nucleic acid extraction cartridge;

C3) starting an insufflation device or a suction device to push or draw the first mixing liquid in the membrane tube for extraction to enter the waste liquid tank through a semi-permeable membrane of the membrane tube for extraction;

C4) taking a second pipette to draw a cleaning liquid from the liquid storage area to be added in the membrane tube for extraction by the working arm;

C5) starting the insufflation device or the suction device to push or draw the cleaning liquid in the membrane tube for extraction to pass through the semi-permeable membrane;

C6) repeating Steps C4 and C5 for 1-4 times; and

C7) moving the membrane tube for extraction to a recovery tube hole in the liquid storage area, and pressing the membrane tube for extraction into the recovery tube hole so that an eluting liquid contained in the recovery tube hole is pressed through the semi-permeable membrane to enter the membrane tube for extraction by the working arm;

D) accomplishing the nucleic acid extraction process.

2. The operating method of a nucleic acid extraction cartridge according to claim 1, wherein the nucleic acid extraction cartridge further comprises:

a nucleic acid extraction cartridge main body:

a waste liquid tank formed on the nucleic acid extraction cartridge main body, comprising:

the membrane tube compartment, employed to place the membrane tube for extraction;

a first connecting port, connecting the waste liquid tank and the membrane tube compartment; and a ventilation port.

3. The operating method of a nucleic acid extraction cartridge according to claim 2, wherein the membrane tube for extraction further comprises:

an open end, arranged on top of the membrane tube for extraction;

a waste liquid drain, arranged under the membrane tube for extraction to connect to the first connecting port; and the semi-permeable membrane, arranged above the waste liquid drain.

4. The operating method of a nucleic acid extraction cartridge according to claim 2, wherein the ventilation port is connected with the suction device.

5. The operating method of a nucleic acid extraction cartridge according to claim 3, wherein the nucleic acid extraction cartridge further comprises the insufflation device, which is connected to the open end.

6. The operating method of a nucleic acid extraction cartridge according to claim 2, wherein the nucleic acid extraction cartridge further comprises the liquid storage area formed on the nucleic acid extraction cartridge main body, and the liquid storage area is employed to store at least one liquid.

7. The operating method of a nucleic acid extraction cartridge according to claim 2, wherein the nucleic acid extraction cartridge further comprises a pipette area formed on the nucleic acid extraction cartridge main body, and the pipette area is employed to accommodate at least one pipette.

* * * * *